(12) United States Patent
Dixon

(10) Patent No.: US 7,076,593 B2
(45) Date of Patent: Jul. 11, 2006

(54) INTERFACE BUS OPTIMIZATION FOR OVERLAPPING WRITE DATA

(75) Inventor: Robert W. Dixon, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 307 days.

(21) Appl. No.: 10/731,285

(22) Filed: Dec. 9, 2003

(65) Prior Publication Data

US 2005/0125605 A1 Jun. 9, 2005

(51) Int. Cl.
*G06F 13/36* (2006.01)

(52) U.S. Cl. .................. 710/310; 710/39; 710/305; 710/107

(58) Field of Classification Search ............... 710/36, 710/5, 74, 100, 112, 107, 39; 711/112

See application file for complete search history.

(56) References Cited

U.S. PATENT DOCUMENTS

| | | | | |
|---|---|---|---|---|
| 5,224,214 A | * | 6/1993 | Rosich | 710/39 |
| 5,963,474 A | * | 10/1999 | Uno et al. | 365/185.04 |
| 6,112,319 A | * | 8/2000 | Paulson | 714/49 |
| 6,374,332 B1 | * | 4/2002 | Mackenthun et al. | 711/145 |
| 6,526,484 B1 | * | 2/2003 | Stacovsky et al. | 711/158 |

* cited by examiner

*Primary Examiner*—Rehana Perveen
*Assistant Examiner*—Kim T. Huynh
(74) *Attorney, Agent, or Firm*—Westman, Champlin & Kelly

(57) ABSTRACT

Embodiments of the present invention are devices with a queue for receiving a plurality of data write requests and having a means for comparing the data write requests in the queue and then requesting only data identified by the data write requests that would not be overwritten by any later received data write requests in the queue. By requesting only the data that is not overwritten by subsequent data write requests, the data actually transferred over the bus is minimized given the current queue of data write requests. One aspect of the present invention includes a method of requesting data from a host over a data bus.

19 Claims, 6 Drawing Sheets

INTERFACE BUS OPTIMIZATION FOR OVERLAPPING WRITE DATA

FIELD OF THE INVENTION

This application relates generally to transferring data over a bus and more particularly to a method for transferring data over a bus to a data storage device for storage.

BACKGROUND OF THE INVENTION

Data buses are increasingly used to connect devices to a host computer system. While the data buses provide the ability to easily attach numerous, disparate devices to a host, the flexibility comes at cost of connection speed as direct, dedicated connections are often much faster than data bus connections. This drawback of decreased connection speed, or bandwidth, is especially apparent when there are large amounts of data being routinely transferred over the data bus.

Typically, a connected storage device receives data write requests requesting the device to write data to certain specified locations on the storage device, referred to as logical block addresses (LBAs). These requests are queued in a request queue as they are received. When the write mechanism of the data storage device is available, the device sends a request to the host to transmit the data associated with the next data write request pending in the queue. When that data are received (or, alternatively, when the data are written), a status message is sent to the host indicating that that data write request has been completed. During busy periods, multiple data write requests may be received and build up in the request queue while data associated with a single data write request is being transferred. If the request queue fills up, no more data write requests will be accepted until room is made in the queue by completing the data transfer associated with the current data write request and the data transfer for the next data write request in the queue is initiated. Therefore, the ultimate speed of the process is limited by the amount of data that ultimately has to be sent to the connected device and the speed of the connecting bus.

The above-described data transfer process occurs even though the pending data write requests in the queue, as often occurs in a data storage device formatting process, may overwrite data from earlier data write requests also pending in the queue. In some applications and processes, it is common for multiple data write requests to be sent to the data storage device that overwrite some or all of the LBAs associated with prior-transmitted data write requests. For example, the host computer may continuously send updated formatting data to be written to the same LBAs on the data storage device during the formatting process. In such data intensive processes, like formatting, wherein the same LBAs on the data storage device are being continuously updated with new data, the fact that the data from each data write request have to be transmitted to the device, just to be overwritten by the next data write request, inefficiently limits the speed of the formatting process.

Accordingly there is a need for increasing the efficiency of transferring overlapping data over a data bus. The present invention provides a solution to this and other problems, and offers other advantages over the prior art.

SUMMARY OF THE INVENTION

Against this backdrop the present invention has been developed. Embodiments of the present invention are devices with a queue for receiving a plurality of data write requests and having a means for comparing the data write requests in the queue and then requesting only data identified by the data write requests that would not be overwritten by any later received data write requests in the queue. By requesting only the data that is not overwritten by subsequent data write requests, the data actually transferred over the bus is minimized given the current queue of data write requests.

One aspect of the present invention includes a method of requesting data from a host over a data bus. In the method, the device compares a first data write request identifying first data and second data to be written with a later received second data write request identifying fourth data and third data to be written. In the method, the third data, if the data write requests were performed in order, would overwrite the second data. Based on the results of the comparison, a request is sent to the host to transmit the first data, the third data and the fourth data over the data bus. The method ends by indicating to the host that the first data write request and the second data write request have been performed.

Another aspect of the present invention is a bus-connected data storage device having a queue for receiving a plurality of data write requests from a host computer. Each of the data write requests identifies data to be written to storage media in the data storage device. The data storage device also includes a means for comparing the data write requests in the queue and requesting only data identified by the data write requests that are not overwritten by later received data write requests in the queue.

These and various other features as well as advantages which characterize the present invention will be apparent from a reading of the following detailed description and a review of the associated drawings.

DETAILED DESCRIPTION

Figure 1:
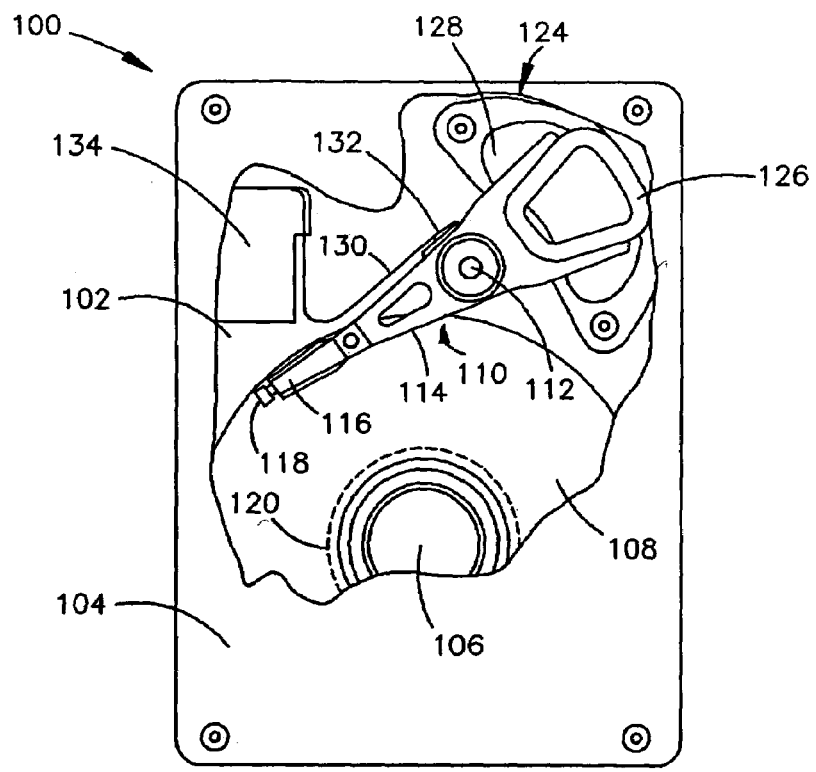
FIG. 1 is a plan view of a disc drive incorporating a preferred embodiment of the present invention showing the primary internal components.

Data storage devices that implement embodiments of the present invention include disc drives, writable optical media discs, tape drives and other data storage devices that may be connected via a bus to a host computer system. An exemplary disc drive 100 constructed in accordance with a preferred embodiment of the present invention is shown in FIG. 1. One skilled in the art will recognize that the embodiments of the present invention described below in reference to a disc drive implementation are not limited to that implementation and could be readily adapted to other data storage devices.

The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an fluid bearing slider enabling the head 118 to fly in close proximity above the corresponding surface of the associated disc 108 as a result of its movement through the fluid atmosphere within the disc drive 100.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
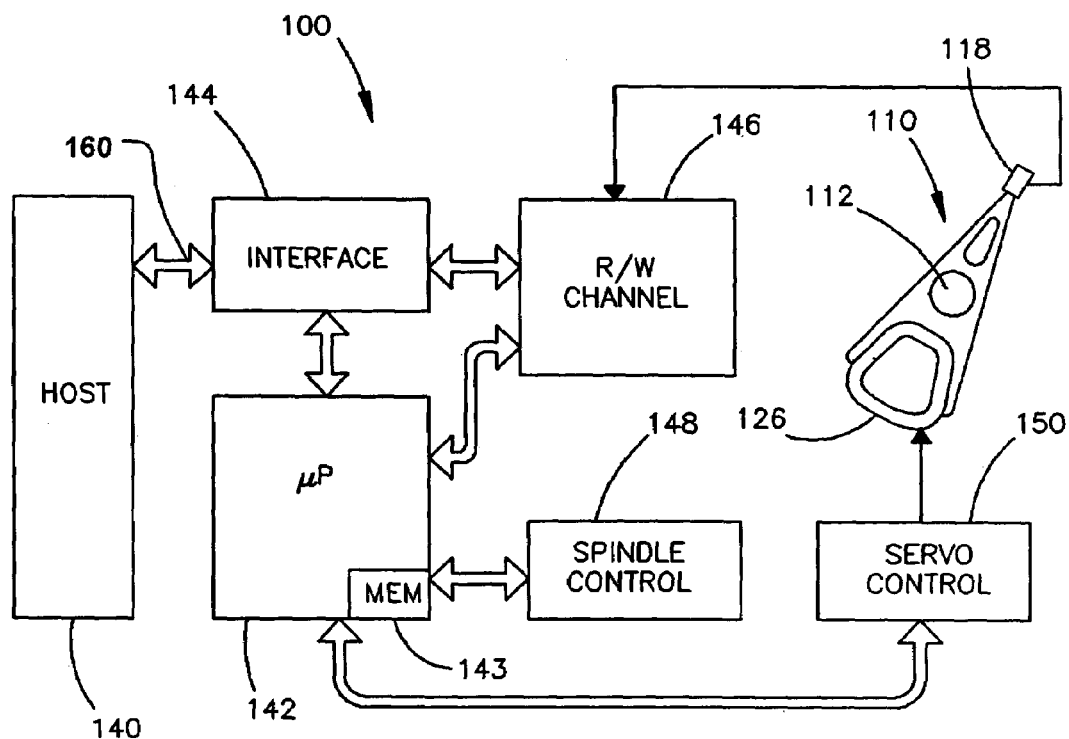
FIG. 2 is a functional block diagram of the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected, in this case via a data bus 160, to a host computer 140 in a conventional manner. The data bus 160 may or may not also connect other devices (not shown) to the host 140. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140, over a connection such as a data bus to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art.

Embodiments of the present invention include devices, such as data storage devices like the disc drive 100 described above, that receive data write requests or other data requests that indicate data is ready to be transmitted to the device from the host over a data bus. The devices include a request queue for queuing requests in the order they are received until such time as they can be performed by requesting the host transmit the data.

Figure 3:
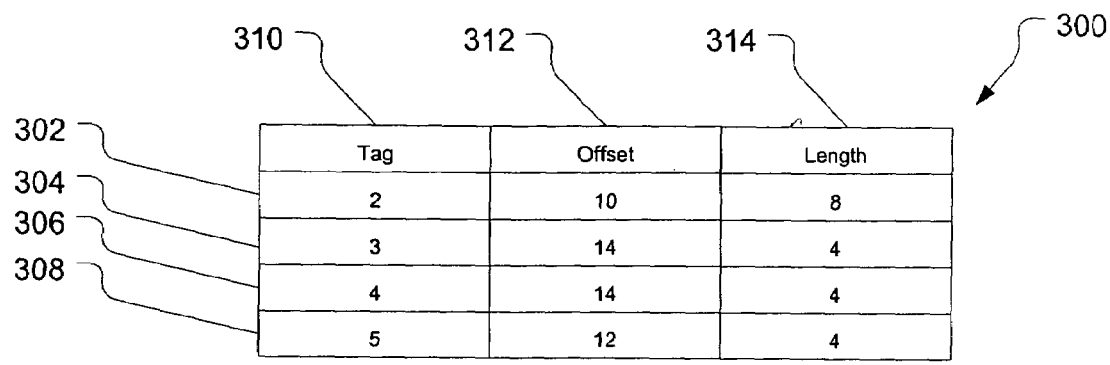
FIG. 3 is an illustration of data write request queue in accordance with one embodiment of the present invention.

FIG. 3 is an illustration of data write request queue in accordance with one embodiment of the present invention. In the FIG., the queue is represented as a table 300 and has four data write requests 302, 304, 306, 308 currently pending. The most recently received data write request 308 is located at the bottom of the table 300. The oldest data write request 302 in the queue is located at the top of the table 300. In the embodiment, data write requests 302, 304, 306, and 308 are characterized by a tag number 310 that identifies the data write request, an offset 312 that identifies the starting location, in the form of a logical block address (LBA), for the data associated with the data write request to be written to, and a length 314 representing the number of LBAs that are required for the amount of data associated with the data write request. For example, the oldest data write request 302 in the queue has a tag number 310 of "2". The offset 312 indicates that the data write should start at LBA "10" and the data will fill a length 314 of "8" LBAs. To assist with the following discussion, FIG. 4 graphically illustrates data write requests pending in the request queue of FIG. 3 in a device in accordance with an embodiment of the present invention.

Figure 4:
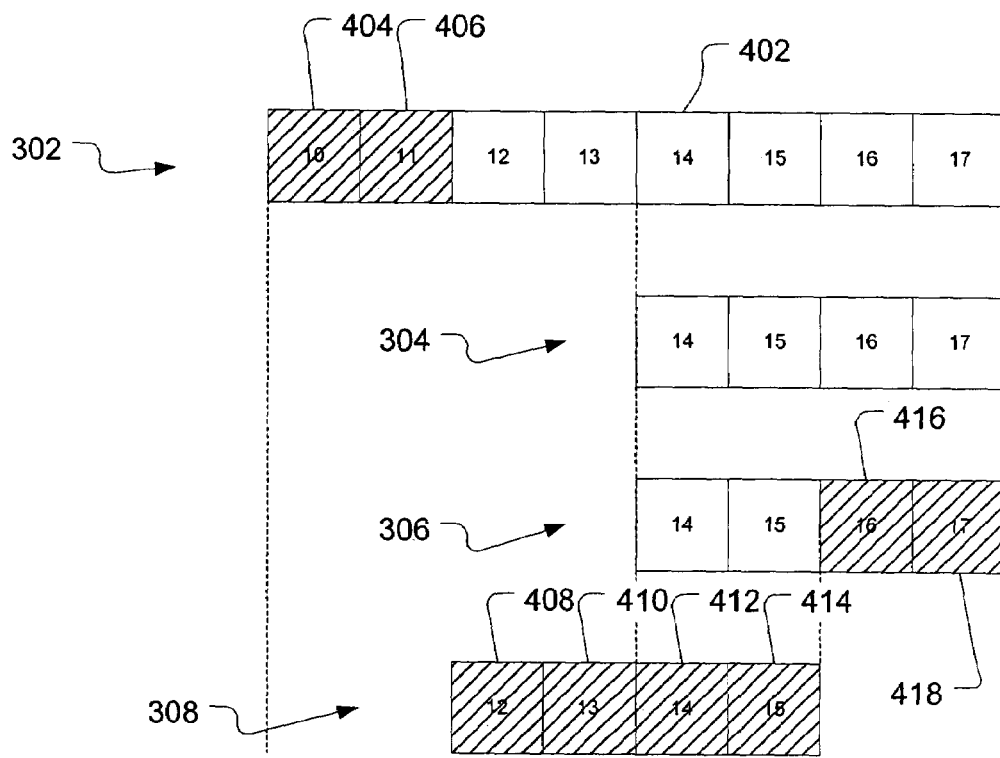
FIG. 4 is a graphical illustration of the four data write requests pending in the request queue shown in FIG. 3.

FIG. 4 is a graphical illustration of the four data write requests 302, 304, 306, 308 pending in the request queue shown in FIG. 3. In FIG. 4, the most recently received data write request 308 is illustrated at the bottom of the FIG. The most recent data write request 302 is located at the top of the FIG. In the FIG., numbered boxes representing each LBA of the data write request are shown, e.g., the oldest data write request 302 is illustrated as eight numbered boxes (representing eight LBAs corresponding to the length 314 of the data write request 302) starting with box number 10 (corresponding to the offset 312 of the data write request 302). Each of the other three data write requests 304, 306, 308 are similarly illustrated below in the order they appear in the queue, but with the LBAs graphically vertically aligned for easy comparison.

An inspection of FIG. 4 indicates that, were all the data write requests 302, 304, 306, 308 performed in the order they were received, the data in some LBAs would be overwritten. The data that would be overwritten are referred to as overlapping data and indicated by boxes with no fill pattern. For example, each data write request, if performed, would write data to LBA number 14 402. On the other hand, some LBAs will not be overwritten by later received data write requests, such as LBA 10 404, that are to be written to as part of the oldest data write request 302. It should also be noted that all of the LBAs to be written to by the second oldest data write request 304 will be overwritten by later received data write requests 306, 308.

The LBAs 404, 406, 408, 410, 412, 414, 416, 418 in each data write request 302, 304, 306, 308 that are not overwritten are illustrated as boxes filled with diagonal lines. These LBAs 404, 406, 408, 410, 412, 414, 416, 418 represent all the LBAs that have to be written in order to completely perform the data write requests 302, 304, 306, 308 currently in the queue. These are: LBA 10 404 and LBA 11 406 from the oldest data write request 302; No LBAs from the second oldest data write request 304; LBA 16 416 and LBA 17 418 from data write request 306; and all the LBAs 408, 410, 412, 414 of the most recent data write request 308.

Figure 5:
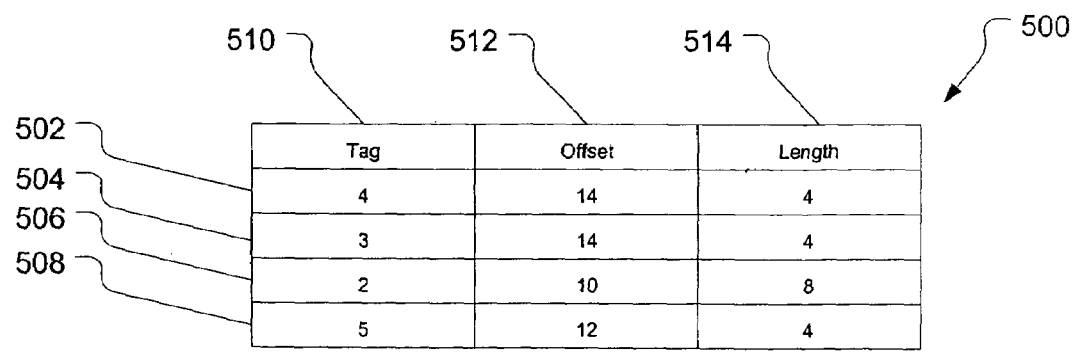
FIG. 5 presents a second data write request queue in accordance with an embodiment of the present invention.

FIG. 5 presents a second queue in the same tabular form as described with reference to FIG. 3. The queue in FIG. 5 has the same data write requests as in FIG. 3, but in a different sequence, i.e., the data write requests 502, 504, 506, 508 were received in a different order.

Figure 6:
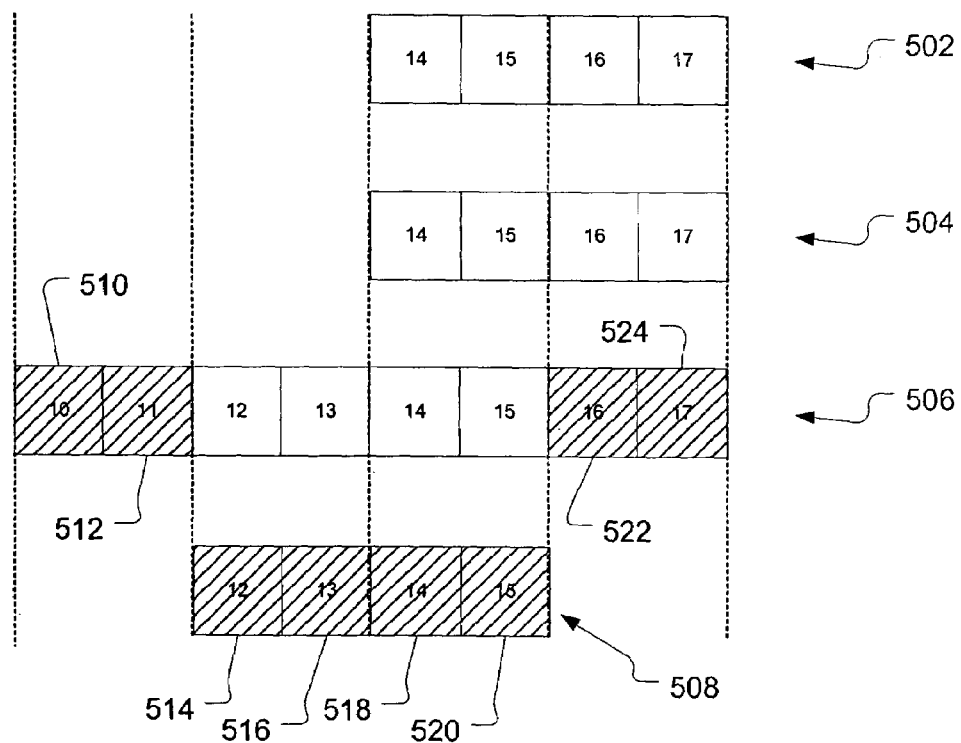
FIG. 6 is a graphical illustration of the four data write requests pending in the request queue shown in FIG. 5.

FIG. 6, then, is a graphical illustration of the four data write requests 502, 504, 506, 508 pending in the request queue shown in FIG. 5 presented in a similar fashion as FIG. 4. An inspection of FIG. 6 will show that although the same data write requests 502, 504, 506, 508 were received, the sequence in which they were received reflects strongly on what LBAs will be overwritten when performing the data write requests in their sequence. Again, FIG. 6 presents as boxes filled with diagonal lines those LBAs 510, 512, 514, 516, 518, 520, 522, 524 that must be written in order to completely perform the data write requests 502, 504, 506, 508 currently in the queue table 500. These are: Nothing from the oldest data write request 502 or the second oldest data write request 504; LBA 10 510, LBA 11 512, LBA 16 522, and LBA 17 524 from third oldest data write request 506; and all the LBAs 514, 516, 518, 520 of the most recent data write request 508.

Embodiments of the present invention are devices with a queue for receiving a plurality of data write requests, such as those described in FIGS. 3–6, and having a means for comparing the data write requests in the queue and then requesting only data identified by the data write requests that would not be overwritten by performing the later received data write requests in the queue. By requesting only the data that are not overwritten by subsequent data write requests, the data actually transferred over the bus are minimized given the current queue of data write requests.

In the example queue described in FIGS. 3 and 4, embodiments of the present invention would request only the data for the LBAs 404, 406, 408, 410, 412, 414, 416, 418 in each data write request 302, 304, 306, 308 illustrated filled with diagonal lines that are not overwritten by the later received data write requests. Likewise, in the example queue described in FIGS. 5 and 6, embodiments of the present invention would request only the data for the LBAs 510, 512, 514, 516, 518, 520, 522, 524 in each data write request 502, 504, 506, 508 illustrated filled with diagonal lines that are not overwritten by the later received data write requests.

In one embodiment of the present invention, this is accomplished by sending to the host computer at least one data transfer request for each data write request that contains LBAs (such as 404, 406, 408, 410, 412, 414, 416, 418 or 510, 512, 514, 516, 518, 520, 522, 524) that are not overwritten by subsequent data write requests. These data transfer requests may take a similar form as the data write requests. For example, the data transfer requests may include the tag number of the data write request for which they are requesting the data, an offset indicating what data to start sending, and a length to indicate how much data to send. Note that the offset need not be the same offset as that sent in corresponding data write request, thus allowing specific data to be selected from the data associated with the data write request.

Taking the queued data write requests 302, 304, 306, 308 of FIGS. 3 and 4 as an example, a device in accordance with one embodiment of the present invention would send the following data transfer requests to the host:

Data transfer request 1=2, 10, 2 (indicating to send the data associated with data write request tag 2, starting at LBA 10 for a length of 2 LBAs);

Data transfer request 2=4, 16, 2 (indicating to send the data associated with data write request tag 4, starting at LBA 16 for a length of 2 LBAs); and Data transfer request 3=5, 12, 4 (indicating to send the data associated with data write request tag 2, starting at LBA 12 for a length of 4 LBAs).

FIGS. 5 and 6 illustrate why more than one data transfer request may be needed. Taking the queued data write requests 502, 504, 506, 508 of FIGS. 5 and 6 as an example, a device in accordance with the present invention would need to generate two data transfer requests for data from the third oldest data write request 506 and one data write request for data from the most recent data write request 508. As such, the device would send the following data transfer requests to the host:

Data transfer request 1=2, 10, 2 (indicating to send the data associated with data write request tag 2, starting at LBA 10 for a length of 2 LBAs);

Data transfer request 2=2, 16, 2 (indicating to send the data associated with data write request tag 2, starting at LBA 16 for a length of 2 LBAs); and Data transfer request 3=5, 12, 4 (indicating to send the data associated with data write request tag 2, starting at LBA 12 for a length of 4 LBAs).

In both of the examples described above, embodiments of the present invention would request the transfer of data for only 8 LBAs. Comparing this to the prior art method of requesting and receiving all the data for each data write request, embodiments of the present invention would transfer the data associated with the sequence of data write requests in the queues in 40% of the time. In the prior art method, 20 LBAs worth of data would have to be transferred over the bus, contrasted with the 8 LBAs worth of data transferred by embodiments of the present invention. In addition, one skilled in the art will note that the deeper the queue, the more efficient embodiments of the present invention become.

Figure 7:
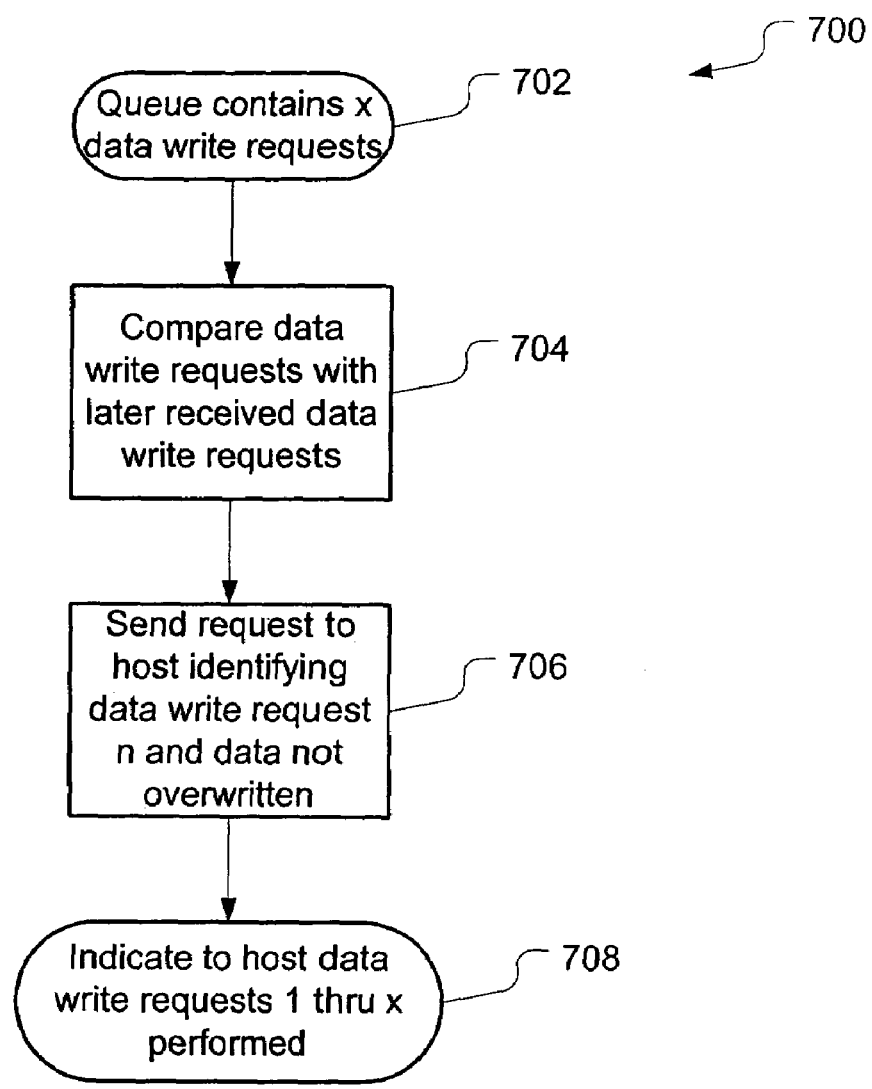
FIG. 7 presents an embodiment of a method to generate data transfer requests in accordance with the present invention.

FIG. 7 presents an embodiment of a method 700 in accordance with the present invention such as would be used by the devices described above to generate data transfer requests. The method 700 starts 702 with a queue containing some number x of data write requests from a host computer. A comparing operation 704 then compares each data write request in the queue with the later received data write requests to determine what data to be written are not overwritten by subsequently received data write requests.

Once the not overwritten data (such as the data associated with those diagonally filled LBAs 404, 406, 408, 410, 412, 414, 416, 418 or 510, 512, 514, 516, 518, 520, 522, 524 in FIGS. 4 and 6) are determined by the comparing operation 704, a request operation 706 requests the not overwritten data from host computer by sending one or more data transfer requests.

The method 700 ends with an indication operation 708 wherein the device sending an indication to the host computer that all of the x data write requests in the queue have been performed. This allows the host to free up those resources, even though in some cases the resources contain data that was never transmitted to the device. In some embodiments, this may require a separate performance indication be sent for each data write request. Such an indication operation may be performed upon receipt of the last of the data requested in the request operation 706. Alternatively, a separate performance indication for each data write request may be sent as that data is received or when that data write request is determined to be completely overwritten by subsequent data write requests.

Figure 8:
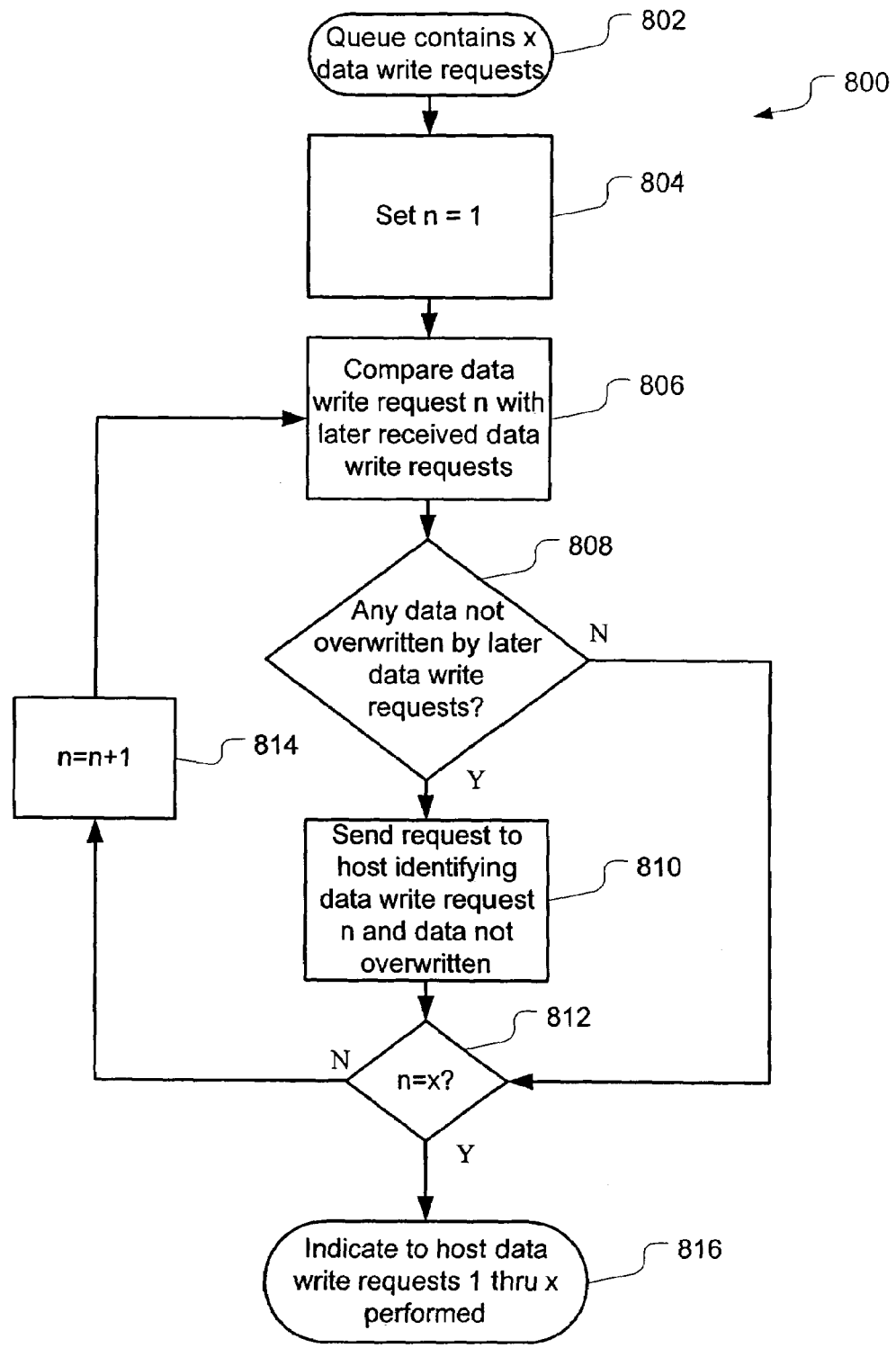
FIG. 8 presents a more detailed embodiment of a method to generate data transfer requests in accordance with the present invention.

FIG. 8 presents a more detailed embodiment of a method 800 in accordance with the present invention such as would be used by the devices described above to generate data transfer requests. The method 800 starts 802 with a queue containing some number x of data write requests from a host computer. Next, an initialize counter operation 804 initializes an index n to be used to identify the current x data write requests in the queue. The index n is initialized to a number (in the embodiment it is 1) that corresponds to the oldest data write request in the queue. In the embodiment shown, the current data write requests are indexed in the order they were received, such that write request 1 is the oldest data write request in the queue.

A comparing operation 806 then compares data write request of index n in the queue with the later received data write requests, i.e., data write requests with a higher index in this embodiment, to determine what data, if any, in data write request n are not overwritten by subsequently received data write requests.

If there are no data in data write request n that are not overwritten, then determination operation 808 transfers control to a second determination operation 812, discussed below.

If there are data in the data write request n that are not overwritten, then determination operation 808 transfers control to a request operation 810 that generates one or more requests for the data from the data write request n that are not overwritten by later received data write requests contained in the queue. Depending on the implementation of the method, these requests may be sent individually as part of the request operation 810 or they may be stored for transmission to the host in batch as part of the indication operation 816 discussed below. In either implementation, when complete, request operation passes control to the second determination operation 812.

The second determination operation 812 determines if all the data write requests have been compared by the comparing operation 806. In the embodiment shown, this is done by checking if the index n is equal to the number of data write requests x that were originally in the queue. If all the data write requests have been compared, then the method 800 terminates with an indication operation 816 such as the one described above with reference to FIG. 7. Note that alternative embodiments of the indication operation 816 may include transmitting an indication after each request operation rather than at the completion of the method.

If all the data write requests have not been compared, then the second determination operation 812 transfers control to an index counter operation 814 that increases the index, in this case by increase the index n by 1, and control returns to the comparing operation 806 to compare the next data write request as described above. Note that in embodiments with different indexing schemes, the index counter operation 814 may index n differently as is appropriate for the scheme.

A close reading of the discussion related to FIGS. 3–6 will reveal that the data transfer requests generated as described above will cause the data to be received by the device "out of order" so to speak. That is, data for LBAs 10 and 11 are received, then data for LBAs 16 and 17 are received and finally data for LBAs 12–15 are received. This aspect of embodiments of the present invention is important if the device is using a first in first out (FIFO) data buffer to receive the data and subsequently write the data to the storage media. Take for example a disc drive with a FIFO buffer and queued data write requests as described in FIGS. 3 and 4. In that example, the FIFO buffer would contain data for LBAs 10 and 11, then data for LBAs 16 and 17, and finally data for LBAs 12–15. As the LBAs on the disc are contiguous, writing this data to a rotating disc would require at least one full revolution, and possibly substantially as much as two revolutions, of the disc to achieve because of the sequence of the data in the buffer. LBAs 10, 11, 16 and 17 would be written the first time those locations are encountered by the write head and then LBAs 12–15 written on the next revolution. Thus, in this example the actual time required to write the data could be substantially halved or more if the data could be received in the logical order in which it is to be written (thus allowing it to be written at the next encounter of the location at once rather than requiring another full revolution of the disc).

Alternative embodiments of the present invention address this feature by resequencing the generated data transfer requests and transmitting them to the host in an order so as to receive the data in the order the data will be written. This places the data into a FIFO buffer in the correct order allowing writing of the data at the next available instant.

Figure 9:
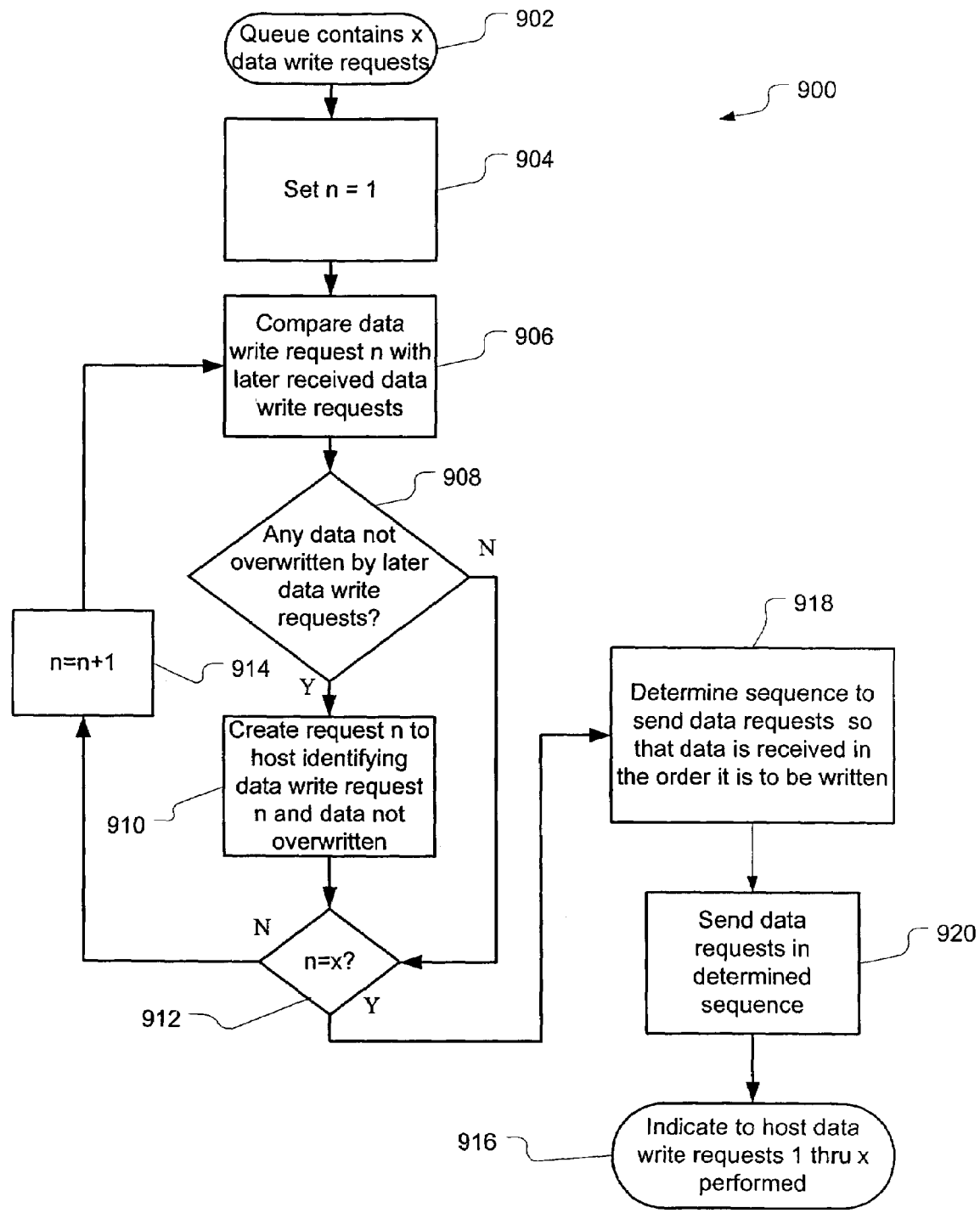
FIG. 9 presents an embodiment of a method that generates data transfer requests and resequences the requests in accordance with the present invention.

FIG. 9 presents an embodiment of a method 900 that not only generates the data transfer requests but also resequences the requests into an order so as to receive the requested data in a desired logical order. The method 900 starts 902 with a queue containing some number x of data write requests from a host computer. Next, an initialize counter operation 904 initializes an index n to be used to identify the current x data write requests in the queue. The index n is initialized to a number (in the embodiment it is 1) that corresponds to the oldest data write request in the queue.

A comparing operation 906 then compares data write request of index n in the queue with the later received data write requests, i.e., data write requests with a higher index in this embodiment, to determine what data, if any, in data write request n are not overwritten by subsequently received data write requests.

If there are no data that are not overwritten, then determination operation 908 transfers control to a second determination operation 912, discussed below.

If there are data in the data write request n that are not overwritten, then determination operation 908 transfers control to a request generation operation 910 that generates one or more requests for the data from the data write request n that are not overwritten by later received data write requests contained in the queue. These requests are stored for resequencing by the sequencing operation 918 discussed below. Control then passes to the second determination operation 912.

The second determination operation 912 determines if all the data write requests have been compared by the comparing operation 906. In the embodiment shown, this is done by checking if the index n is equal to the number of data write requests x that were originally in the queue. If all the data write requests have not been compared, then an index counter operation 914 increases the index, in this case by increase the index n by 1, and control returns to the comparing operation 906 to compare the next data write request as described above.

If all the data write requests have been compared, then control is passed to a sequencing operation 918. The sequencing operation 918 determines the appropriate sequence in which to send the data transfer requests generated by/the request generation operation 910 so as to receive the data in a desired logical order, such in a the order the data is to be written.

Once the sequence is determined, a send operation 920 transmits the data transfer requests to the host in the sequence determined by the sequence operation 918.

The method 900 terminates with an indication operation 916 such as the one described above with reference to FIG. 7. Note that alternative embodiments of the method may combine the send operation 920 and the indication operation 916 so as to send an indication after each data transfer request is received rather than after completion of the rest of the method 900.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, a method could first inventory what LBAs are identified by the data write requests in the queue. Then, rather than starting a comparison operation by comparing the oldest data write requests, the alternative embodiment could start with the most recent data write request noting that the most recent request will consist entirely of data that are not overwritten. The method could then work back until data that has been overwritten are determined for all of the LBAs initially identified. Any earlier data write requests are then summarily discarded as containing only overwritten data. This embodiment may be practical when there are very large queues of data write requests. Numerous other changes may be made which will readily suggest themselves to those skilled in the art and which are encompassed in the spirit of the invention disclosed and as defined in the appended claims.

What is claimed is:

1. A method of requesting data from a host over a data bus comprising:
    comparing a first data write request identifying first data and second data to be written and a later received second data write request identifying fourth data and third data to be written, the third data overwriting the second data;
    sending at least one request to the host to transmit the first data, the third data and the fourth data over the data bus without sending a request to transmit the second data; and
    indicating to the host that the first data write request and the second data write request have been performed, without receiving the second data from the host.

2. The method of claim 1, wherein sending comprises:
    sending a first request to the host identifying the first data write request and requesting the first data without requesting the second data.

3. The method of claim 2, wherein sending further comprises:
    sending a second request to the host identifying the second data write request and requesting the third data and the fourth data.

4. The method of claim 3, further comprising:
    receiving the first data, third data and fourth data; and
    buffering the first data, third data and fourth data on a write buffer in a sequence the data are to written to data storage media.

5. The method of claim 1, wherein indicating further comprises:
    deleting the first data write request and second data write request from a request queue.

6. The method of claim 1, further comprising:
    determining a sequence that the first data, third data and fourth data are to be written;
    sending a first request to the host identifying the first data write request and requesting the first data;
    sending a second request to the host identifying the second data write request and requesting the third data;
    sending a third request to the host identifying the second data write request and requesting the fourth data; and
    sending the first request, second request and third request in the sequence that the first data, third data, and fourth data are to be written.

7. The method of claim 1, wherein indicating comprises:
    sending a first indication after receipt of the first data; and
    sending a second indication after receipt of the third and fourth data.

8. The method of claim 1, wherein comparing comprises:
    comparing a first data write request identifying first data and second data to be written, a previously received third data write request identifying fifth data to be written, and a later received second data write request identifying fourth data and third data to be written, the third data overwriting the second data and the fifth data if the data write requests were performed sequentially; and
    indicating to the host that the third data write request has been performed without receiving the fifth data identified by the third data write request.

9. A method of transferring data from a host to a disc drive over a bus comprising:

queuing a plurality of data write requests including a first received data write request, each data write request identifying one or more logical block addresses (LBAs) at which to write associated data on the disc drive;

determining first LBAs identified by the first received data write request that are not overwritten by later received data write requests in the plurality of data write requests; and sending at least one data transfer request to the host to transmit over the bus only the data associated with the first LBAs of the first data write request.

10. The method of claim 9 further comprising:

repeating the determining operation for each of the plurality of data write requests to identify second LBAs in each data write request that are not overwritten by later received data write requests in the plurality of data write requests; and sending at least one data transfer request to the host for each data write request to transmit over the bus only the data associated with the identified second LBAs that are not overwritten by later received data write requests in the plurality of data write requests.

11. The method of claim 9 further comprising:

deleting the plurality of data write requests; and sending a notification that the plurality of data write requests have been performed.

12. The method of claim 9 further comprising:

maintaining a sequential queue for receiving the plurality of data write requests while the disc drive is busy.

13. The method of claim 9, wherein each data write request includes a tag that identifies the data write request, an offset that identifies an LBA, and a length and further comprising:

including in each data transfer request a tag, an offset and a length identifying the data write request and LBAs that are not overwritten by later received data write requests.

14. The method of claim 10 further comprising:

generating all the data transfer requests for the data associated with the identified first and second LBAs that are not overwritten by later received data write requests in the plurality of data write requests prior to sending any of the at least one data transfer requests; and sequencing the generated data transfer requests into a sequence that will result in the data being received in a logical order.

15. The method of claim 14, wherein sending comprises:

sending the generated data transfer requests in the sequence.

16. The method of claim 15, further comprising:

determining a second received data write request that contains only LBAs that are overwritten by later received data write requests in the plurality of data write requests; and sending a notification to the host that the second data write request has been performed without receiving the data identified by the second data write request.

17. A bus-connected data storage device comprising:

a queue for receiving a plurality of data write requests from a host computer, the data write requests identifying data to be written; and a means for comparing the data write requests in the queue and requesting only data identified by the data write requests that are not overwritten by later received data write requests in the queue.

18. The data storage device of claim 17 wherein the means for comparing and requesting generates at least one data transfer request for each of the plurality of data write requests that contains data that is not overwritten by later received data write requests in the queue.

19. The data storage device of claim 18 wherein the means for comparing and requesting determines the appropriate sequence to send the data transfer requests in order to receive the data in an order the data is to be written.

* * * * *